March 3, 1942.     W. OWEN     2,274,729
GLASS HANDLING APPARATUS
Filed Jan. 12, 1940     3 Sheets-Sheet 2
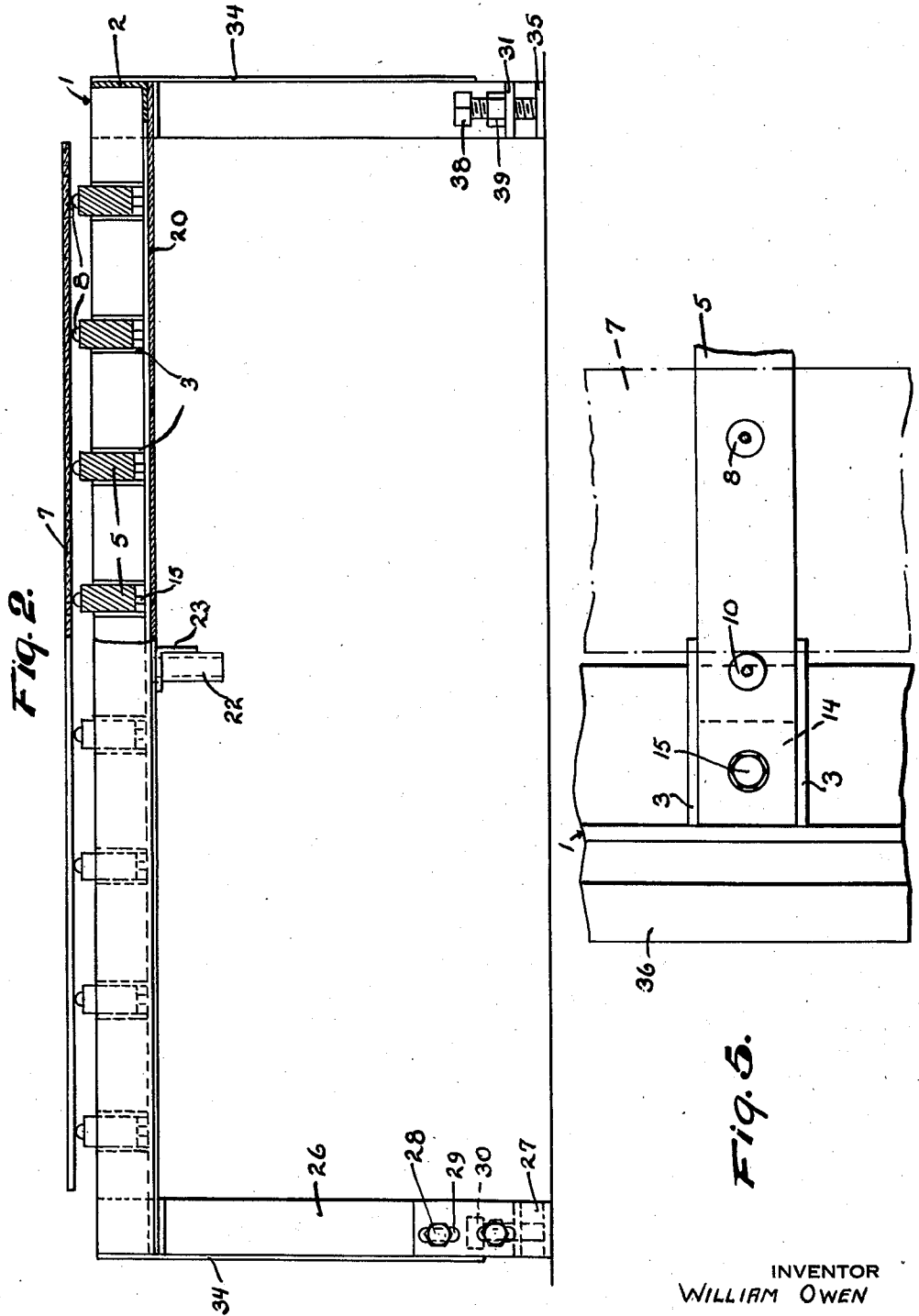
INVENTOR
WILLIAM OWEN
BY Olen E. Bee
ATTORNEY.

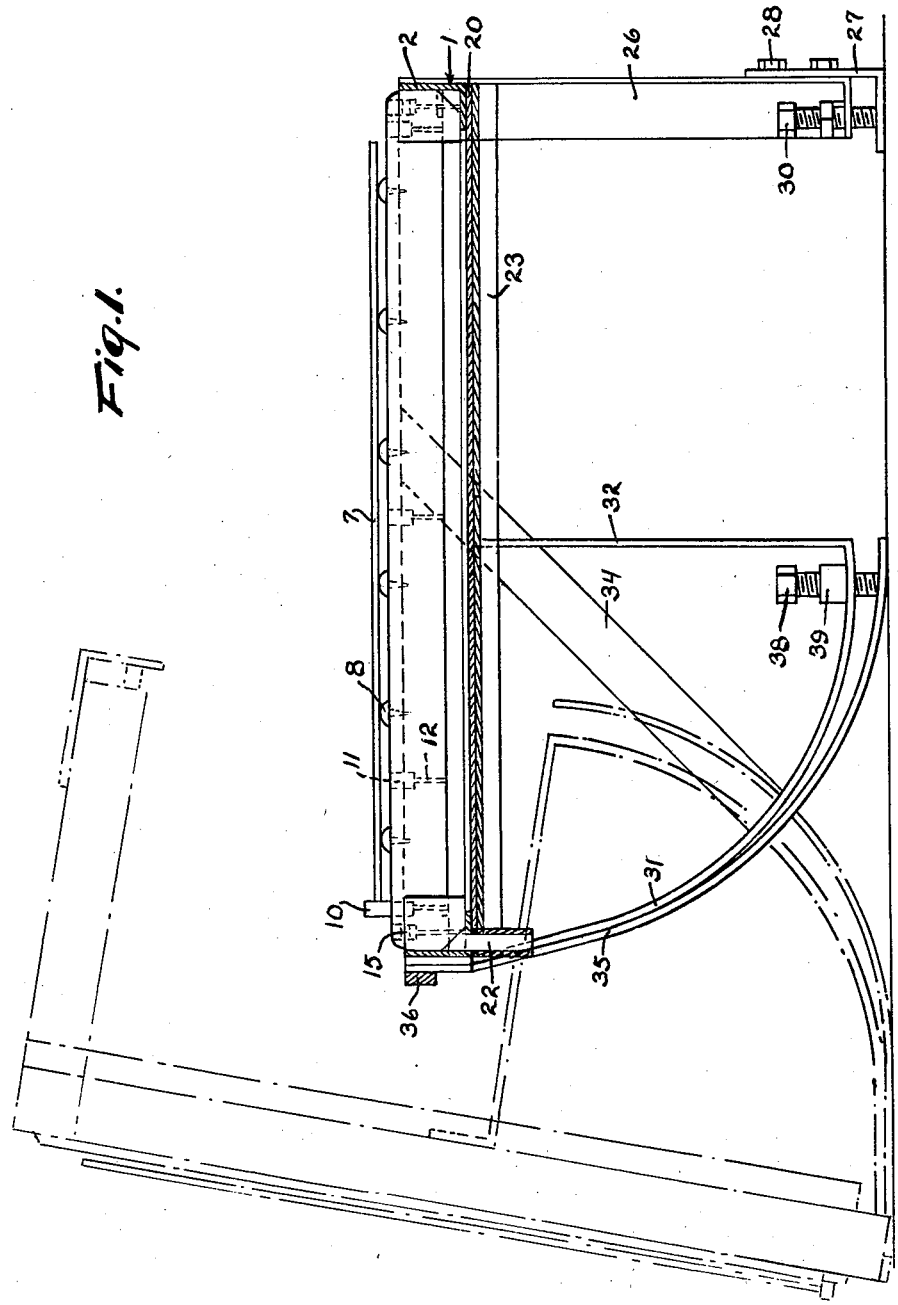

March 3, 1942.    W. OWEN    2,274,729
GLASS HANDLING APPARATUS
Filed Jan. 12, 1940    3 Sheets-Sheet 3
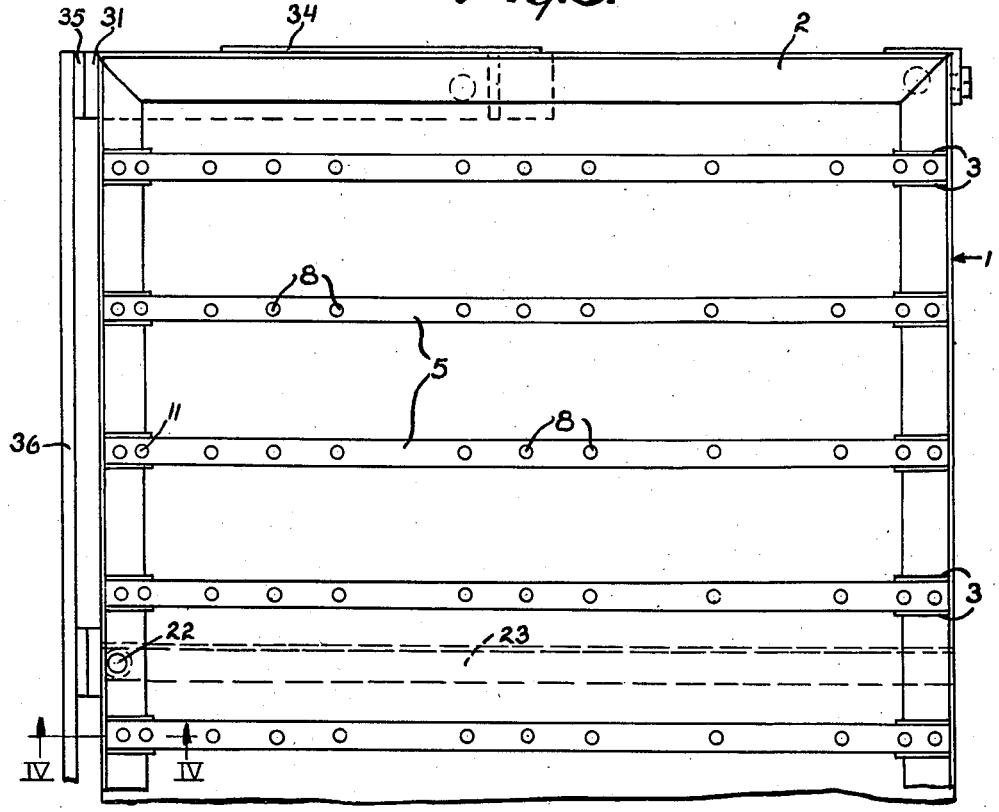
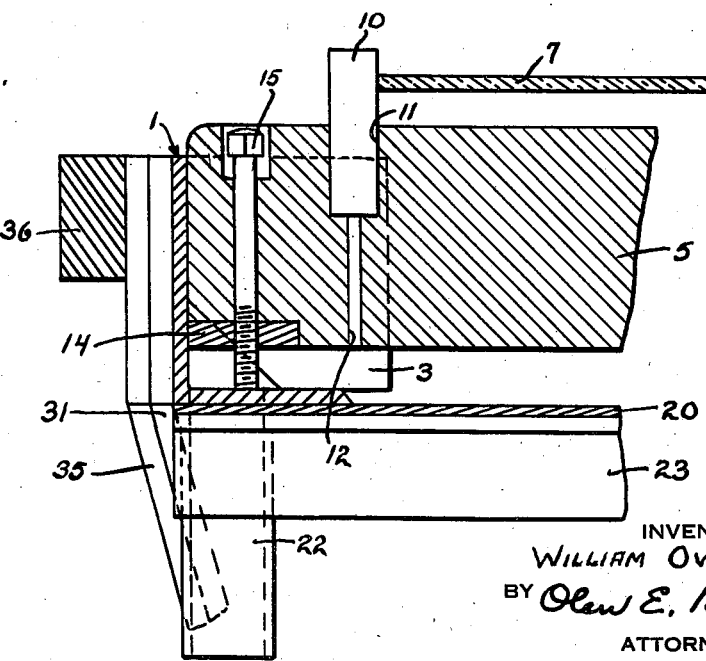
INVENTOR
WILLIAM OWEN
BY Olew E. Bee
ATTORNEY.

Patented Mar. 3, 1942

2,274,729

UNITED STATES PATENT OFFICE 2,274,729

GLASS HANDLING APPARATUS

William Owen, Pittsburgh, Pa., assignor to Pittsburgh Plate Glass Company, Allegheny County, Pa., a corporation of Pennsylvania Application January 12, 1940, Serial No. 313,557

4 Claims. (Cl. 91—12.4)

The present invention relates to glass handling apparatus and more particularly to a tiltable table which is adapted to support glass plates during the application of metallic reflecting films thereto.

A primary object of the invention is the provision of a silvering table so designed that positioning of the glass plates to be mirrored thereon is possible with a minimum of labor and which will support the glass plates during the silvering operation in a true horizontal plane.

Another object of the invention is the provision of means whereby not only the entire table may be adjusted to an absolute level, but also the elements thereof which support directly the glass plates may also be levelled through an independent adjustment.

Other objects and advantages of the invention will become more apparent from the following detailed description of a preferred embodiment thereof taken in conjunction with the accompanying drawings wherein:

Figure 1 is a vertical sectional view of an apparatus constructed in accordance with my invention;

Figure 2 is an end elevation, partially in section, thereof;

Figure 3 is a fragmentary plan view of the apparatus;

Figure 4 is a fragmentary vertical sectional view taken substantially along the line IV—IV of Figure 3; and Figure 5 is a fragmentary plan view of one of the transverse members of the table.

Referring to the drawings, the silvering table comprises a skeleton frame 1 of angle irons 2 substantially of L-shape in cross-section, suitably joined together at the corners. Guide plates 3 arranged in pairs are secured at spaced intervals to opposite sides of the frame within the angle irons. Transverse members 5 are positioned between each pair of guide plates 3 to form a platform upon which glass plates 7 are supported during the application of a mirror surface thereto. At intervals along the transverse members 5, cushioning elements 8 of rubber, cork or other resilient material are anchored in order that there will be no direct contact between the glass plates and the platform. At each end of the transverse members 5, pegs 10 are provided to prevent lateral movement of the glass plates over the table. These pegs fit within openings 11, extending into the members 5, and additional openings are provided in the members for the accommodation of plates of various sizes. Drains 12 project through the members 5 in order that the openings will remain free of water, etc.

Since it is absolutely essential that the glass plates 7 be maintained in a true horizontal position, during the application of silver films, the transverse members 5 are fitted at each end with plates 14 drilled and threaded to receive bolts 15 passing through the transverse members. The bolts 15 extend beyond the plates 14 and contact the base of the angle iron forming the skeleton frame. Advancing or retracting the bolts 15 result in a corresponding vertical movement of the transverse members 5 with relation to the skeleton frame 1. The bottom of the frame 1 is fitted with a metal plate 20 which may be covered or protected by a film of rubber or waterproof asphaltum paint. A drain 22 is provided in the plate in order that waste materials collected within the tank, formed by the plate and the frame, may be removed. A reinforcing member 23 is placed immediately beneath the bottom plate 20 to strengthen the structure.

The table or platform as hereinbefore described is supported by vertical members 26 dependent from two adjacent corners thereof and to each of the members 26 is secured an auxiliary foot 27 (Fig. 2) by means of bolts 28 passing through slots 29. An adjusting screw 30 extending through the base of the members 26 contacts the foot 27 and the length of the members 26 may be regulated by movement of the screw 30, after which the bolts 28 are tightened to prevent further movement of the foot 27.

The remaining corners of the platform are supported upon curved legs 31 which extend under the platform and are braced centrally thereof by the vertical supports 32 interlocking with the platform angles 2. Spoke members 34, rigidly connected to and extending downwardly from the table, strengthen the curved feet 31 to which the members are also rigidly connected. An auxiliary curved leaf 35 underlies each of the curved legs 31 and one end is positively secured to the elevated platform by the bar 36, which serves as a counterweight. The opposite end of each auxiliary leaf 35 is movable with relation to the adjacent end of the curved leg 31 by means of an adjusting screw 38 passing through a lug 39 and contacting the free end of each auxiliary leaf 35. In this manner the length of these supporting elements may be varied as desired to permit accurate levelling of the table.

The legs 31 and 35 thus serve as rockers and the platform is rotatable or rockable from a horizontal position to a substantially vertical position, as indicated by the dotted lines in Figure 1. While in such vertical position the glass plates 7 to be silvered are positioned upon the transverse members 5 of the platform. This mode of operation facilitates placement of the glass plates, not only with respect to their loading upon the table prior to silvering but also their removal from the table after the reflecting film has been deposited. The entire platform is counterweighted and balanced in such manner that very little effort is required to return it to the horizontal position, even with the full load of glass plates. After the table has been loaded and it has been returned to the horizontal position the several transverse members may be adjusted until the glass plates are absolutely level. In the event that considerable adjustment is necessary a major portion of the levelling can be accomplished through adjustment of the lengths of the curved and vertical legs 32 and 26 supporting the platform. After the glass surfaces are levelled the various treating solutions are applied thereto and the metallic reflecting film deposited upon the plates. The deposited films may be washed and dried while resting upon the table, excess liquids being collected in the trough and escaping through the drain as provided.

The table is particularly well adapted to handle a plurality of small plates at one time since each of the transverse members 5 may be levelled independently of the others. In this manner every plate supported upon the table may be brought to a true plane position for silvering. At the same time, however, large plates of glass may be handled upon the described apparatus with equal facility.

It will be apparent that various modifications in the arrangement of the several elements forming the apparatus are possible without departing from the spirit of the invention or the scope of the appended claims.

What I claim is:

1. An elevated platform adapted to support glass plates during silvering operations comprising a skeleton frame, a series of transverse members secured thereto in spaced relation, cushioning elements carried by the transverse members, a trough disposed beneath the frame, vertical legs dependent from two corners of the frame, and curved legs dependent from the remaining corners of the frame, extending thereunder and braced centrally thereof, upon which the frame is rotatable from a horizontal position to a substantially vertical position.

2. An elevated platform, as described in claim 1, in which the dependent legs are adjustable to facilitate leveling of the frame.

3. An elevated platform, as described in claim 1, in which the dependent legs carry auxiliary members adjustable with relation to the fixed portions of the legs for levelling of the frame.

4. An elevated platform adapted to support glass plates during silvering operations comprising a skeleton frame, a series of transverse members positioned therein in spaced relation, cushioning elements disposed along the upper surfaces of the transverse members, means for levelling the transverse members with relation to the frame, a trough secured beneath the frame provided with an outlet for the disposal of waste material collected therein, vertical legs dependent from two adjacent corners of the frame, auxiliary feet adjustably secured to the vertical legs, curved legs dependent from the remaining corners of the frame, extending thereunder and braced centrally thereof, auxiliary leaves underlying the curved legs, adjustably spaced in relation thereto, upon which the frame may be rotated from a horizontal position to a substantially vertical position, and means for retaining articles upon the upper surface of the frame during such rotation.

WILLIAM OWEN.